Patented Jan. 3, 1933

1,892,727

UNITED STATES PATENT OFFICE

WILHELM HAUBENSAK AND WALTER AUGUST WETTERWALD, OF ZURICH, SWITZERLAND

VALVE FOR FOOTBALLS AND OTHER INFLATABLE ARTICLES

Application filed March 12, 1930, Serial No. 435,202, and in Switzerland October 24, 1929.

This invention relates to valves for footballs and other inflatable articles.

According to the invention such a valve comprises an internally projecting flexible tube formed on the bladder, and having an exterior flange, a metallic sleeve inserted into said tube and provided with an internal screw thread and an internal valve seating, and a retaining member for the flexible tube screwed into the metal sleeve and adapted to force the flexible tube down on to the valve seating, with or without a removable adapter capable of being screwed into the metal sleeve.

The valve according to the invention permits the ball to be laced up readily since this is possible when the bladder is deflated, therefore no projecting metal parts are present which is a valuable feature when the ball is used in head play. The valve permits the ball to be well rounded and allows deflation to take place readily since it is only necessary to raise the retaining tube slightly from the valve seating.

Figure 1:
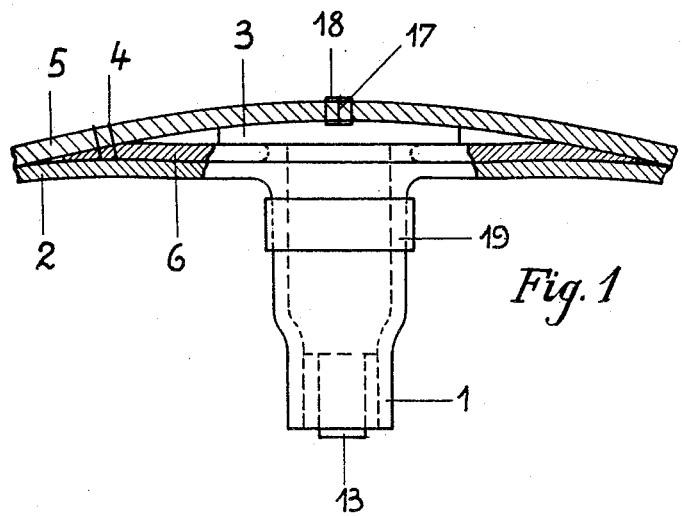
Figure 2:
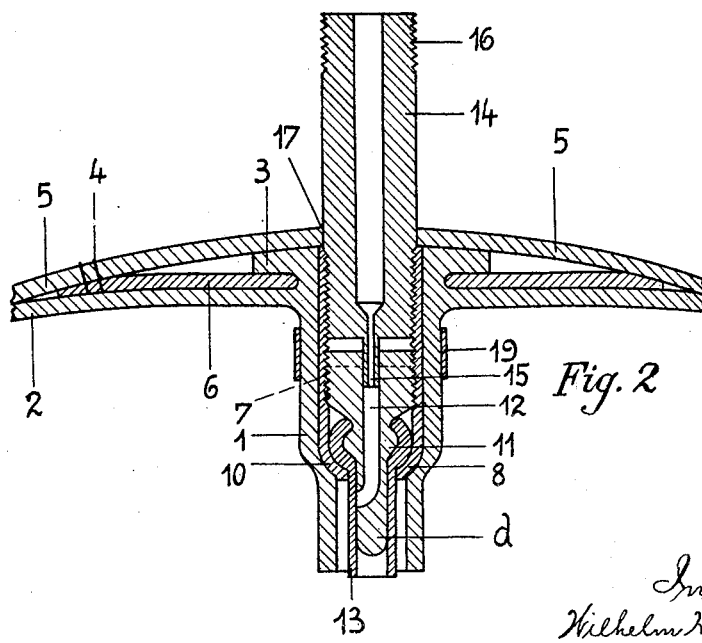

One construction according to the invention is illustrated diagrammatically by way of example in the accompanying drawing, in which Figure 1 shows an elevation of the valve as applied to a foot-ball, while Figure 2 shows the valve in longitudinal section.

In the construction illustrated the valve comprises a flexible tube 1, projecting inwards into a bladder 2, and having an external flange 3. In the annular space between this flange and the bladder 2 there is inserted a protecting piece of leather 6 having a central hole and secured by stitching 4 to the leather cover 5, this piece of leather 6 serving to secure the bladder to the cover. In the flexible tube 1 is inserted a metal sleeve 10 provided with an internal thread 7 and a valve seating 8 which sleeve is secured against sliding out by means of a shrunk-on ring 19. The thickened inner end of the retaining tube 11 has a conical surface and is screwed in to the internal thread of the metal sleeve 10, the central bore 12 of this tube 11 opening out against the wall of the tube 13.

When the retaining tube 11 is screwed into the metal sleeve 10 the inner end of the rubber tube 13, which is pulled on round the retaining tube 11 is forced down on to the valve seating 8.

A removable adapter 14 for the pump is provided and has a screw thread on each end and at its inner end a thin tubular extension 15 which engages in the bore of the retaining tube 11 and thereby ensures the correct supply of air to the retaining tube.

By screwing in the adapter 14 into the metal sleeve 10 the internal air pressure is prevented from driving the adapter out. The pump connector is screwed on to the outer thread 16 of the adapter 14.

The valve is used in the following manner:

After the bladder 2 provided with the adapter 14 has been placed within the leather ball the edges of the slit 17 in the cover 5 are drawn together by means of a lace which can readily be done as the bladder is not yet blown up.

The adapter 14 projects through the slit 17 in the cover and is screwed on to the pump. The bladder 2 is then blown up, the rubber tube 13 on the exit opening of the bore 12 being raised somewhat from the extension $d$ by the air entering the bladder. After the pumping has ceased however, it again lies across and seals the above-mentioned opening. The adapter 14 is then screwed out of the metal tube 10 and the ends of the laces 18 are led under the cover 5 by running them backwards and forwards across the slit 17 whereby the penetration of dirt into the valve is prevented. The ball is now ready for play. In order to deflate the bladder 2 the retaining tube 11 is unscrewed a few turns whereby the pressure of the conical surface of the tube 11 on the flexible tube 13 is released and the air can escape from the bladder between the member 13 and the sleeve 10 as well as through the internal thread of the metal sleeve 10.

The use of this valve is considerably more simple, easy and time saving than that of the known bladder adapter, and in spite of the fact that the valve consists of metal the hard impact of the ball on the head in head play is avoided owing to there being no exposed metal portion of the valve.

We claim:

1. In an inflatable ball in combination, an inner elastic bladder, an internally projecting flexible tube formed integral with said bladder, a sleeve within said tube, a reinforcing ring surrounding said flexible tube and adapted to press the tube wall against said sleeve, and a valve structure within said sleeve.

2. In an inflatable ball in combination, a laced outer protecting cover, an inner elastic bladder, an internally projecting flexible tube formed integral with said bladder, a flexible disc between said cover and bladder, means formed integrally on said tube for gripping said disc, an internally threaded sleeve within said tube, a retainer tube adapted to be screwed into said internally threaded sleeve, the opening of said internally projecting flexible tube being protected by the lacing of the cover so as to protect the valve structure.

3. In an inflatable ball in combination, an inner elastic bladder, an internally projecting flexible tube, an internally threaded sleeve within said tube, a retainer tube screw threaded into said sleeve and adapted to be seated on a flange of said sleeve, a reinforcing ring surrounding said flexible tube and adapted to press the tube wall against said sleeve.

In testimony that we claim the foregoing as our invention, we have signed our names.

WILHELM HAUBENSAK.
WALTER AUGUST WETTERWALD.